UNITED STATES PATENT OFFICE.

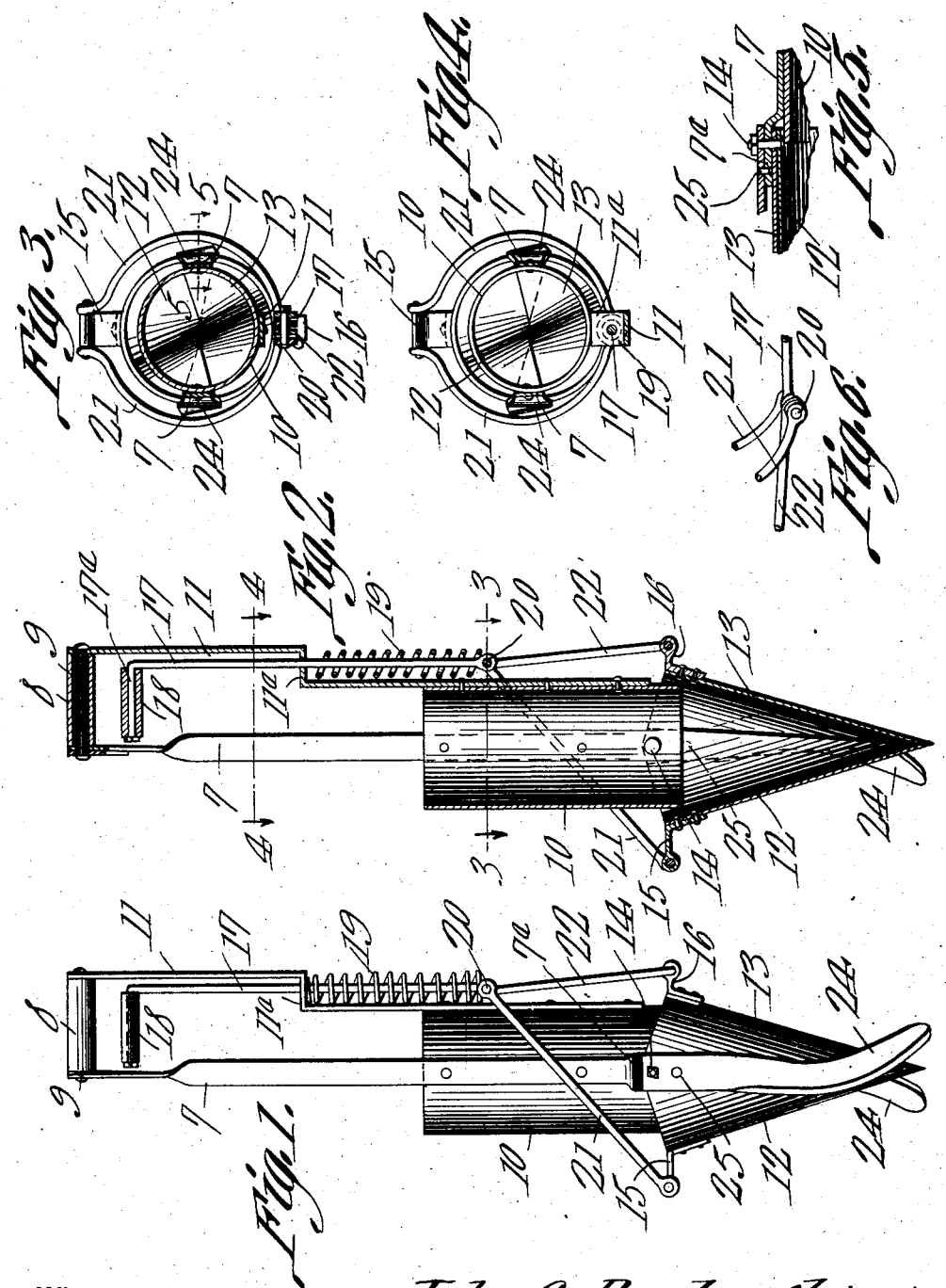

JOHN C. BERHORST, OF FORT MADISON, IOWA, ASSIGNOR OF ONE-HALF TO FRED D. CASE, OF FORT MADISON, IOWA.

PLANT-SETTER.

1,010,572. Specification of Letters Patent. Patented Dec. 5, 1911.

Application filed June 19, 1911. Serial No. 634,117.

*To all whom it may concern:*

Be it known that I, JOHN C. BERHORST, a citizen of the United States, residing at Fort Madison, in the county of Lee and State of Iowa, have invented a new and useful Plant-Setter, of which the following is a specification.

This invention relates to plant setters, which are commonly used for transplanting young plants, flowers and the like.

The objects of this invention are to provide an efficient, convenient and simple device of this character with which the young plants can be inserted properly into the ground; to provide a device of this character which when inserted into the ground will not clog up with dirt; and to provide such a device which has improved means for surrounding the plant with soft earth as the device is being removed from the ground. To this end there are employed the novel combination and arrangement of parts hereinafter described and as illustrated in the accompanying drawings.

In the drawings, in which similar reference characters indicate similar parts, Figure 1 is a side elevation of the preferred form of my invention; Fig. 2 is a central vertical section; Fig. 3 is a section on the line 3—3 of Fig. 2; Fig. 4 is a section on the line 4—4 of Fig. 2; Fig. 5 is a vertical section in detail on the line 5—5 of Fig. 3; and Fig. 6 is a fragmentary view in perspective of the connection between the blade-operating links and the upper rod.

Referring specifically to the drawings, there are shown at 7—7 a pair of vertical and parallel bars which are brought together at their upper ends and to which is secured the horizontal handle 8 by means of the bolt or pin 9 passing therethrough. This handle 8 lies in a vertical plane, that is, at right angles to the common vertical plane of the center lines of the two bars. Between the lower ends of the bars 7—7 is secured a vertical cylindrical shell or guide 10 by means of rivets or in any other suitable manner. The extreme lower ends of the bars 7—7 are offset outwardly as indicated at $7^a$ at the lower edge of the cylindrical shell 10. A brace 11 is secured to the other end of the handle by means of the bolt or pin 9 and depends vertically to be secured to the side of the cylindrical shell 10 intermediate the bars 7—7. Intermediate the handle 8 and cylindrical shell 10 this brace has the inner step or shoulder $11^a$.

To the lower ends of the bars 7—7 and within the offset portions $7^a$ thereof are pivoted the two shovel-blades 12 and 13. These blades 12 and 13 are approximately semi-cylindrical in cross section at their upper ends and merge to a point at their lower ends. Together they form an approximate inverted conical shell. The edges of the adjacent blades butt against each other at their lower ends but extend diagonally upward to overlap each other toward their upper ends and at each side thereof a bolt 14 pivotally connects the said blades within the offsets $7^a$, thus pivoting the two blades within each other at their upper ends and also to the lower end of the bars 7—7. To the backs and at the upper edges of the respective blades 12 and 13 are secured the bearing-brackets 15 and 16. A vertical rod 17 passes through and is guided by the step or shoulder $11^a$ of the brace 11 to bring the upper end thereof within the said brace and the lower end thereof outside of the said brace. The upper end of the rod 17 extends to a point directly below the handle 8 and is bent at right angles as indicated at $17^a$ to become parallel to the handle 8. On the said end $17^a$ of the rod 17 is a handle 18. To the lower end of the rod 17 are connected the link 22 and the twin links 21 by means of a pin 20 which passes through eyes in the adjacent ends of the said links and rod. The other end of the said link 22 is pivoted to the bearing-bracket 16 of the blade 13, which is on the same side of the cylindrical shell 10 as the rod 17, and the links 21 are curved around the cylindrical shell 10 and bars 7—7 on the opposite sides thereof to be pivoted to the bearing-bracket 15 of the blade 12 on the opposite side of the cylindrical shell 10 with respect to the brace 11 and rod 17. A coiled spring 19 surrounding the lower end of the rod 17 seats between the shoulder or step $11^a$ and the joint formed by the pin 20 and links 21 and 22 to give a downward pressure or tension to rod 17 and links 21 and 22 to retain the blades in closed position, as shown in the drawings. On the outer faces of the lower ends of the bars 7—7 are secured the knife-blades 24 which depend downwardly over the edges of the shovel-blades 12 and 13, being secured to the said bars by means of the bolt 14 and rivet 25 or in any other suitable manner. Toward their lower ends these knife-blades are bent in an approximate helical direction with respect to the vertical axis of the cylindrical shell 10 and the joint blades 12 and 13. The respective edge of each of the knife-blades 24 is bent outwardly or away from the axis of the joint blades 12 and 13.

It will be noted that the lower end of the cylindrical shell or guide 10 projects into the upper ends of the blades 12 and 13 as allowed by the offset portions 7ᵃ of the bars 7, which is apparent by reference to Fig. 5. The shovel-blades also being pivoted within the offset portions prevents any interference with the cylindrical guide.

In use, the handles 8 and 18 are gripped by one hand of the operator and the nose or point of the blades 12 and 13 is forced into the ground to a suitable depth as is customary. The plant is then inserted into the cylindrical shell 10 and is guided thereby into the space between the shovel-blades 12 and 13, although the plant may be inserted therein prior to the blades being forced into the ground. Then by drawing the handle 18 upward, the links 21 and 22 are pulled upward against the tension of the spring 19 and the lower ends of the shovel-blades 12 and 13 are spread or opened, thus pushing the earth apart and permitting the plant to drop out. Then as the blades are retracted from the ground by giving the handle 8 a slight turn in the proper direction, the knife-blades 24 throw soft dirt in against and around the plant through the opening formed by the parted blades 12 and 13, due to the shape of the said knife-blades. These knife-blades as they turn cut into the earth and deflect the same inward, thus surrounding the plant with soft earth which holds the plant in position and gives it cultivated soil to grow in.

Owing to the shearing effect of the overlapping edges of the blades 12 and 13, the dirt is prevented from clogging the same up, and the opening between them is closed when they are swung together, as will be understood. When the blades 12 and 13 have been retracted from the ground by releasing the handle 18, the spring 19 forces the blades 12 and 13 together again for a new operation.

This device is both efficient and convenient in its use and is simple in its operation.

The construction of the invention can be altered within the scope of the appended claims and it is not desired to limit same to the specific form as shown and described.

Having described my invention, what I claim as new is:

1. In a plant setter, the combination of a pair of vertical bars, the lower extremities of which are off set outwardly, a cylindrical guide secured between the lower ends of the said bars, a pair of shovel blades arranged between the off set ends of the said bars, each shovel blade being semi-circular in cross section at its upper end and merging to a point at its lower end and the edges thereof extending diagonally upward to overlap each other toward the upper end, the said upper ends of the shovel blades being pivoted together and to the off set ends of the said bars, and means for swinging the lower ends of the said blades open.

2. In a plant setter, the combination of a pair of vertical bars, shovel-blades pivoted to the lower ends thereof, means for opening said shovel-blades, and a knife-blade disposed at the adjacent edges of the said shovel-blades arranged to extend over the opening formed between the shovel-blades when they are swung apart, one edge of the said knife blade being bent outwardly.

3. In a plant setter, the combination of a pair of vertical bars, shovel-blades pivoted to the lower ends thereof, means for opening said shovel-blades, and knife blades secured to the lower ends of the said bars and depending downwardly and arranged to extend over the opening formed between the shovel-blades when they are swung apart, one of the edges of the said knife blades being bent outwardly.

4. In a plant setter, the combination of a pair of vertical bars, a handle secured to the upper ends thereof, a cylindrical guide secured between the lower ends of the said bars, a pair of shovel-blades pivoted to the lower ends of the said bars, a brace secured to the said handle and to the said cylindrical guide and having a shoulder intermediate said handle and cylindrical guide, a spring-pressed rod passing through the said shoulder, a handle on the upper end thereof, and links connecting the lower end thereof with the backs of the said shovel-blades, the links which connect the said rod and the back of the shovel-blade on the opposite side thereof being curved around the opposite sides of the cylindrical guide.

5. In a plant setter, the combination of a pair of vertical bars, a handle secured to the upper ends thereof, a cylindrical guide secured between the lower ends of the said bars, a pair of shovel-blades pivoted to the lower ends of the said bars, a brace secured to the said handle and to the said cylindrical guide and having a shoulder intermediate the said handle and cylindrical guide, a rod passing through the said shoulder, a handle on the upper end thereof, a coiled spring on the lower end of the said rod, and links connecting the lower end of the said rod with the backs of the said shovel-blades, the links which connect the said rod and the back of the shovel-blade on the opposite side thereof being curved around the opposite sides of the said cylindrical guide, the aforesaid spring having a compression between the said shoulder and the lower end of the said rod.

6. In a plant setter, the combination of a pair of vertical bars, the lower extremities of which are offset outwardly, a cylindrical guide secured between the lower ends of said bars, shovel-blades pivoted within the offset ends of the said bars, and means for opening the said shovel-blades.

In testimony that I claim the foregoing as my own, I have hereto affixed my signature in the presence of two witnesses.

JOHN C. BERHORST.

Witnesses:
JOHN R. HELLING,
JOHN B. SCHOMAKER.

Copies of this patent may be obtained for five cents each, by addressing the "Commissioner of Patents, Washington, D. C."